United States Patent [19]

Coles et al.

[11] 3,727,171
[45] Apr. 10, 1973

[54] BUS CONNECTOR ASSEMBLY

[75] Inventors: Sidney J. Coles, Carlisle; Bernard C. Teal, Ancaster, Ontario; Gordon D. Waye, Three Rivers, Quebec, all of Canada

[73] Assignee: Westinghouse Canada Limited, Hamilton, Ontario, Canada

[22] Filed: July 23, 1971

[21] Appl. No.: 165,461

[52] U.S. Cl. ............339/22 B, 339/242, 339/272 R
[51] Int. Cl. ................................................H01r 13/60
[58] Field of Search..........................339/242, 19, 22, 339/95, 198 G, 198 GA, 272; 248/68, 72

[56] References Cited

UNITED STATES PATENTS

| | | | |
|---|---|---|---|
| 3,551,876 | 12/1970 | Walter | 339/21 |
| 2,537,719 | 1/1951 | Tuepker | 174/45 |
| 3,452,317 | 6/1969 | Carlson | 339/95 R |
| 2,791,461 | 5/1957 | Goldenberg | 294/85 |

FOREIGN PATENTS OR APPLICATIONS

| | | | |
|---|---|---|---|
| 1,247,436 | 8/1967 | Germany | 339/22 B |
| 496,659 | 10/1953 | Canada | 339/22 B |
| 521,375 | 3/1931 | Germany | 339/198 G |

*Primary Examiner*—David H. Brown
*Assistant Examiner*—Robert A. Hafer
*Attorney*—A. T. Stratton et al.

[57] ABSTRACT

A bus bar having a T-shaped cross section for receiving a sliding bus connector which is provided with a T-shaped recess corresponding to the T-shaped bus bar is disclosed herein. The bus connector is further provided with an aperture which is in partial communication with said recess to receive a suitable cable conductor therein. A set screw assures intimate contact of the wire conductor and the bus bar because of the common communication and the set screw pressure on the cable simultaneously fixes the location of the connector on the bus bar.

2 Claims, 2 Drawing Figures

PATENTED APR 10 1973    3,727,171

BUS CONNECTOR ASSEMBLY

BACKGROUND OF THE INVENTION

The interface between the conducting wires and the bus bars of a panelboard has always presented a problem to a panelboard designer. It has been standard practice over the years to drill and tap holes in the copper or aluminum bus bars and attach suitable terminal lugs to the bus bars by means of bolts passing through the lugs into the tapped holes. The lugs generally contained an opening for accepting a wire conductor, and usually a set screw pressed the conductor against an opposing wall of the opening in the terminal lug. This procedure assured contact between bus bar, lug, and conductor and also provided a method of permanently locating the lug on the bus bar. It is immediately seen that the interface between the wire conductors and the bus bar was solved in the past by the addition of two more interfaces.

PRIOR ART REFERENCES

The following Canadian Patents are believed to be pertinent: Pat. Nos. 838,853; 726,298; 702,164; 644,903; 519,041; 496,659; 451,442.

The U.S. Pat. to Walter No. 3,551,876 is believed to be pertinent.

SUMMARY OF THE INVENTION

This application describes a method of connecting a wire conductor to a bus bar which eliminates the necessity of having two electrical interfaces. This is accomplished by providing a bus bar which is of a generally T-shaped cross section on which is mounted a number of shaped connectors. The connectors have a T-shaped recess to cooperate with the T-shaped bus bar, so as to be conveniently fitted on and slipped along the T-shaped bus bar. A suitable aperture is provided in the connector to receive a wire conductor therein. The aperture is arranged to be in communication with the recess so that when a wire conductor of a suitable size is inserted therein, there will be a substantial area of contact between the wire conductor and the bus bar. A suitable set screw presses the wire against the top of the "T" of the bus bar to increase the pressure and size of the contact area and the connector is thus permanently located on the bus bar.

BRIEF DESCRIPTION OF THE PREFERRED EMBODIMENT

Figure 1:
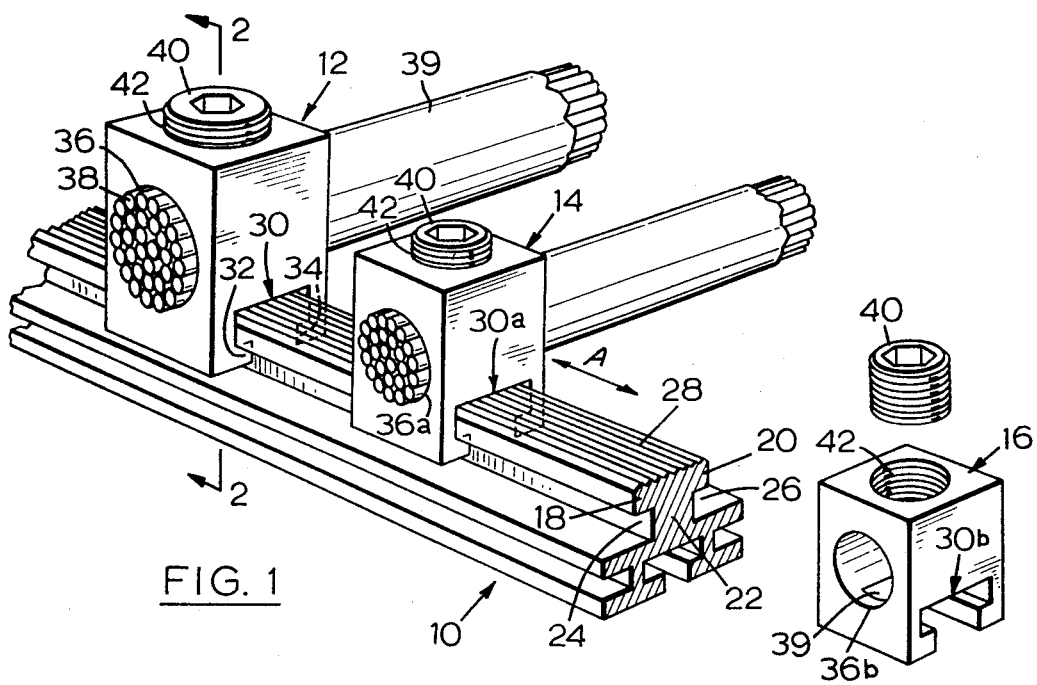
FIG. 1 shows the general method of attachment of various wire cable conductors to a bus bar.

Referring now to FIG. 1, a bus bar 10 is shown having a complex cross section. The part of the bus bar which is of concern to this application is the generally T-shaped upper cross section. What appears to be a complicated cross section is generally explained by the use of an extruded copper or aluminum bus bar. It is by the extrusion process that an infinite variety of cross sectional shapes for the bus bars are conveniently available.

The upper T-shaped portion of the bus bar is arranged to accommodate the sliding terminal clamping connectors 12, 14 and 16. This is accomplished by providing projections 18 and 20 on the central portion 22 of the T-shaped bus bar. By this means, a pair of slots 24 and 26 are provided in the bus bar to receive lower projections 32 and 34 of the connectors. The top surface of the "T" of bus bar 10 is shown having serrations such as 28 formed therein. Suitable apertures such as the one shown as 36 in connector 12 are provided to receive cables such as cable 38. Cable 38 may have an insulating coating such as that shown at 39 for convenient handling.

In order to secure cable 38 in the aperture 36, a set screw 40 is provided in the threaded opening 42 in member 12. It is easily seen that screw 40 may be used to compress cable 38 downwardly against the serrations 28 of the bus bar 10 to assure good electrical contact. Cable 38 may also be simultaneously pressed against the interior of aperture 36 as well as against the serrations 28 on the bus bar 10. This assures good electrical contact between the cable 38 and the bus bar 10, as well as assuring that connector 12 is firmly fixed on the bus bar 10.

In order to receive different sized conductors, it is possible to vary the size of the connectors such as shown by connectors 12, 14 and 16. Each connector fits on the bus bar 10 in the same manner but each connector has a different sized aperture as illustrated by apertures 36, 36a and 36b.

It is also possible to provide a multi-apertured connector where a number of apertures are provided in spaced relationship in the same connector, and in some instances it may be desirable to have two set screws located on each aperture so that cables may be inserted from each end of the aperture in the conductor and be separately secured to the bus bar 10. Many other variations are possible using the principle outlined, but it is not felt necessary to describe these at length in this disclosure.

Figure 2:
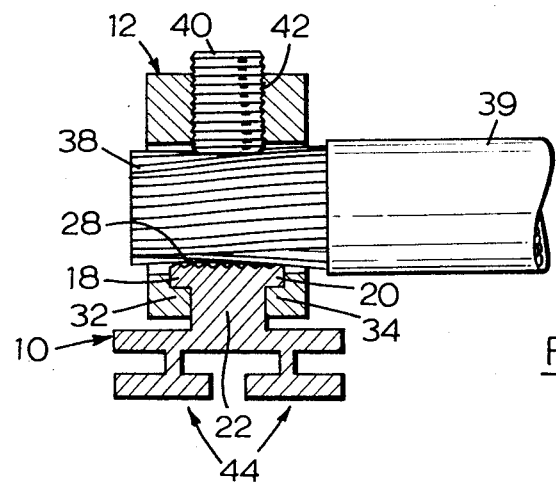
FIG. 2 is a cross sectional view of the connector, wire and bus bar interface of one of the connectors shown in FIG. 1.

FIG. 2 illustrates the clamping techniques utilized by connector 12 by showing a cross section of the connector 12 along the section line 2—2 of FIG. 1. The set screw 40 combines with feet 32 and 34 to compress cable 38 down against serrations 28 on bus bar 10. It is seen that serrations 28 assure positive locking of cable 38 in the connector-bus bar confinement.

By the use of this connection technique, it will be seen that the cable and bus bar meet at a common interface and the electrical contact is particularly efficient. This leads to the upgrading of previous equipment because most equipment of this nature is rated by its "hot spot" temperature, the "hot spot" temperature must decrease and the rating of the equipment may be generally increased.

It is also seen that the bus bar now contains no tapped holes and the bus bar of this invention is of a shape which readily dissipates heat by radiation and convection. Thus, this method of attachment of connectors and cable frees the designer from the standard flat bus bar configuration which has been necessary because of fastening considerations in the past so that other design criteria may now be considered.

In summation, this invention provides a connection to a bus bar which is very versatile, in that the number of locations for the connector on the bus bar is infinite, the connection between the cable and bus bar is direct and intimate and the number of components making up the connection is reduced over prior art methods.

We claim:

1. A connector assembly comprising an elongated bus bar, said bus bar comprising an elongated connecting part along the length of said bus bar, said connecting part being generally T-shaped in cross section, a unitary terminal connector having a recess therein, said recess being generally T-shaped in the cross section of said terminal connector to mate with said T-shaped connecting part with the top of said recess closely overlying said bus bar to capture said terminal connector against substantially all transverse movement on said bus bar while permitting longitudinal sliding movement of said terminal connector on said bus bar, said terminal connector having an aperture therein extending through said terminal connector transverse to the extension of said recess, said T-shaped connecting part at the top thereof extending upward into said aperture, said terminal connector having a tapped opening therein extending into said aperture, and a screw connector threaded into said tapped opening whereby when a conductor is positioned in said aperture said screw connector can be screwed in said tapped opening to force said conductor against said connecting part to thereby pressure connect said conductor to said connecting part and to thereby lock said terminal connector against longitudinal sliding movement of said bus bar.

2. A connector assembly according to claim 1, and the top surface of said connecting part being formed with serrations extending generally transverse to the direction of extension of said aperture.

* * * * *